United States Patent
Danielsson

[11] 3,777,714
[45] Dec. 11, 1973

[54] ANIMAL WATERING DEVICE
[75] Inventor: Nils Harry Danielsson, Nykvarn, Sweden
[73] Assignee: Alfa-Laval AB, Tumba, Sweden
[22] Filed: Jan. 19, 1972
[21] Appl. No.: 218,935

[52] U.S. Cl.................................. 119/75, 119/72.5
[51] Int. Cl............................................ A01k 07/00
[58] Field of Search...................... 119/75, 72.5, 71, 119/53.5

[56] References Cited
UNITED STATES PATENTS

| | | | |
|---|---|---|---|
| 3,703,159 | 11/1972 | Rose-Miller | 119/71 X |
| 2,510,252 | 6/1950 | Pine | 119/72.5 |
| 3,537,430 | 11/1970 | Peppler | 119/72.5 |
| 2,034,968 | 3/1936 | Bartlett | 119/72.5 |
| 2,775,227 | 12/1956 | Millies | 119/72.5 |
| 3,179,085 | 4/1965 | McKillip, Jr. | 119/75 |
| 3,613,642 | 10/1971 | Restall et al. | 119/72.5 X |
| 3,677,231 | 7/1972 | Blough | 119/75 |

FOREIGN PATENTS OR APPLICATIONS 922,962  4/1963  Great Britain..................... 119/72.5

Primary Examiner—Louis G. Mancene
Assistant Examiner—James H. Czerwonky
Attorney—Cyrus S. Hapgood

[57] ABSTRACT

A bowl with an overflow outlet is positioned to receive and collect water from a valve connected to a water supply line. The valve is adjusted by stop means to drip the water into the bowl at a desired rate; but when an animal sucks the valve, a rotatable element thereof is actuated to initiate a continuous flow of water through the valve.

3 Claims, 2 Drawing Figures

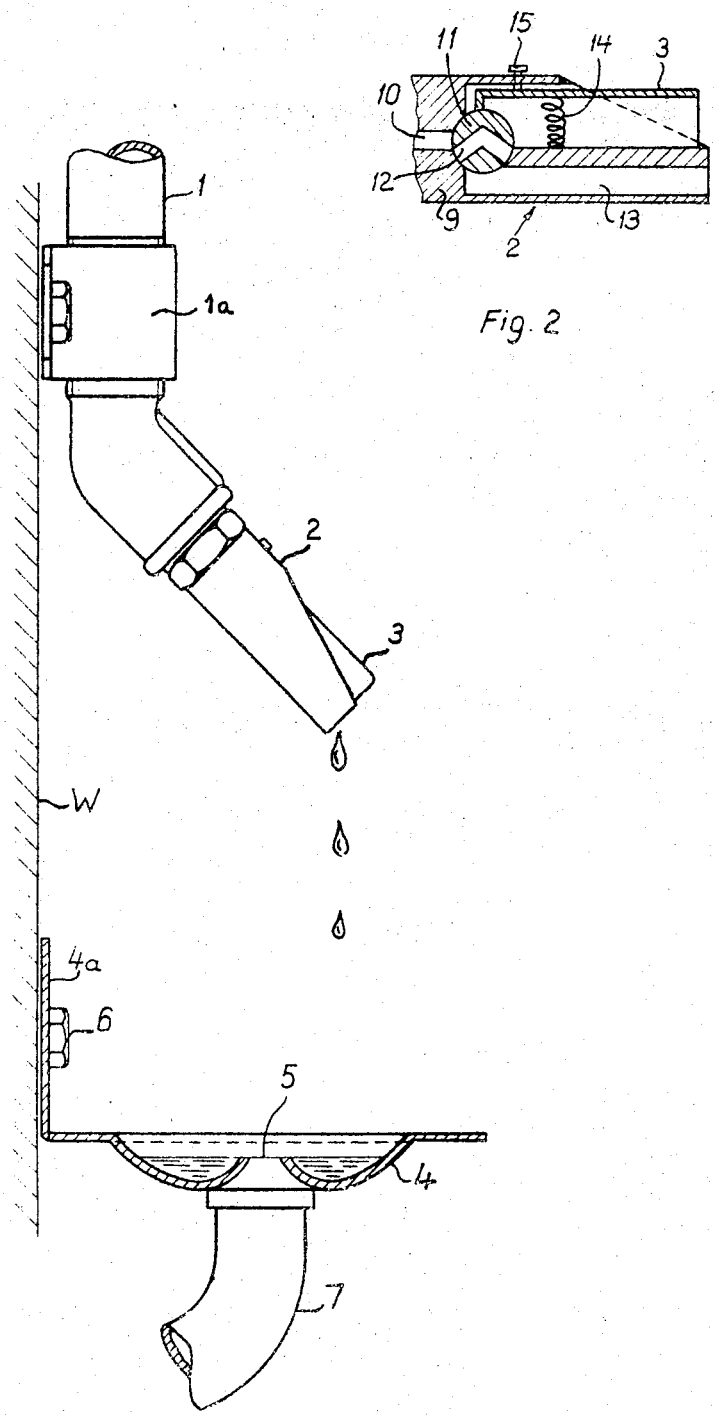

ANIMAL WATERING DEVICE

The present invention relates to a novel device for watering animals, particularly smaller animals such as suckling pigs.

The new device comprises a valve connected to a water pipe and which is adjustable for delivering water at a certain rate of droplet speed, and a bowl with an overflow arranged beneath the valve. The device is characterized particularly in that the valve is provided with means arranged for initiating a continuous water flow when the animal actuates the same by sucking the valve.

Newborn suckling pigs, which are almost exclusively bred in special boxes during their early lives, should be provided with a supply of fresh drinking water in as comfortable and simple a manner as possible. Moreover, it is of great importance for the cleanliness and comfort of the pigs that the box be kept as dry as possible by leading away an eventual excess of water.

This is effected practically and at low cost with the device of the present invention, which is described more in detail below with reference to the attached drawing.

In the drawing,

FIG. 1 is a side elevational view, partly in section, of a preferred form of the new device, and FIG. 2 is a longitudinal sectional view of part of the device shown in FIG. 1.

In the drawing, a water pipe 1 is secured to the box wall W by a bracket 1a. A valve 2 is connected to the water pipe 1 and has its outlet end situated at a suitable distance from the box wall W and preferably about 25 cm. above the box floor (not shown). The valve 2 is of the type which can be adjusted for delivering water at a predetermined but variable rate of droplet flow. The valve 2 is also provided with an element 3 arranged to initiate a continuous water flow when the animal actuates it by sucking the valve 2.

A bowl 4 has an overflow 5 and is horizontally arranged beneath the valve 2, the overflow preventing excess water from flowing over the edge of the bowl 4. The overflow 5 as shown is situated at the center of the bowl 4, but it can be situated anywhere in the bowl beneath its edge.

The bowl 4 is secured to the box wall by a screw 6, the threaded part of which extends through a vertical slot (not shown) in an upwardly extending part 4a of the edge of the bowl. Thus, the elevation of the bowl can easily be varied within the length of the slot. For watering suckling pigs, the edge of the bowl 4 is preferably situated about 12.5 cm. above the box floor.

According to the invention, the outlet of the overflow 5 is connected to a discharge pipe 7, through which excess water is led away from the bowl 4 to a destination outside the box (e.g., a manure pit). The discharge pipe 7 may be of galvanized iron pipe or the like but preferably is a flexible polyethene tube.

In its form shown in FIG. 2, the valve 2 comprises a housng 9 provided at its inlet end with a central longitudinal passage 10 which receives water directly from pipe 1 (FIG. 1). The passage 10 leads to the periphery of a cylindrical valve member 11 extending transversely of the housing and seated therein for rotation about the cylinder axis, whereby a port 12 in the valve member is adapted to connect the inlet passage 10 to a discharge passage 13 in the housing.

The element 3 (FIG. 1) is fixed to valve member 11 and has its outer end exposed for actuation (downward in FIG. 2) when an animal sucks the end portion of valve 2. Such actuation rotates valve member 11 clockwise from its initial position (FIG. 2) against the action of a compression spring 14, thereby causing a continuous flow of water to the discharge passage 13 by way of inlet passage 10 and port 12 of the valve member.

When this sucking action ceases and the animal releases the exposed end of element 3, spring 14 returns the parts 3 and 11 to their initial positions shown in FIG. 2, wherein the element 3 is urged against the inner end of an adjustment screw 15. The latter is operable from outside the housing to adjust the initial position of element 3 and valve member 11, whereby water drips from passage 10 to passage 13 at a desired rate by way of the substantially closed port 12. Alternatively, the screw 15 may be withdrawn sufficiently to completely close the port 12 and thereby cut off such dripping.

For watering newborn pigs, the valve 2 is adjusted by means of screw 15t to supply to the bowl 4 fresh water at a rate of 100–150 droplets per minute, whereby the pigs drink exclusively from the bowl. Any excess of water flows away at the overflow 5 and is discharged outside the box through the discharge pipe 7.

At an age of 2–3 weeks, the pigs instinctively begin to drink directly from the valve 2 by actuating the element 3, at which time the dripping is shut off by adjustment of screw 15. The bowl now functions merely to collect waste water, which flows away from discharges in the manner stated above.

I claim:

1. In combination with a box for breeding animals, such as suckling pigs, a watering device comprising a valve having an inlet adapted for connection to a water supply pipe and also having an outlet end portion in the box, said valve having adjustable stop means mounted thereon and also having valve means for dripping water through said outlet end portion, said valve means being adjustable to vary the rate of said dripping and including a rotatable element actuatable by an animal sucking said outlet end portion to deliver a continuous flow of water through said end portion, a bowl positioned below said outlet end portion to collect the dripping water and having an overlfow outlet above the bottom of the bowl, a discharge pipe for receiving water from the overflow outlet and having a discharge end located outside the box, and means mounting said bowl for vertical adjustment in the box.

2. The combination of claim 1, in which said overflow outlet is located at the center of the bowl.

3. The combination of claim 1, wherein said valve means also include a valve member to which said actuatable element is connected, said valve member having a water passage and being mounted for swinging movement of said actuatable element in one direction to position said passage for said continuous flow in response to said sucking by an animal, said actuatable element being biased in the direction opposite to said one direction, the valve stop means comprising a stop for limiting movement of the actuatable element in said opposite direction, said stop being adjustable to vary said dripping rate.

* * * * *